United States Patent
Liu et al.

(10) Patent No.: US 6,826,963 B2
(45) Date of Patent: Dec. 7, 2004

(54) PANEL TESTING APPARATUS

(75) Inventors: Tai-Sheng Liu, Chung Li (TW); Chi-An Wu, Lin Kou Hsiang (TW)

(73) Assignee: Quanta Computer, Inc., Kuei Shan Hsiang (TW)

( * ) Notice: Subject to any disclaimer, the term of this patent is extended or adjusted under 35 U.S.C. 154(b) by 6 days.

(21) Appl. No.: 10/295,212

(22) Filed: Nov. 15, 2002

(65) Prior Publication Data

US 2004/0065155 A1 Apr. 8, 2004

(30) Foreign Application Priority Data

Oct. 4, 2002 (TW) ...................................... 91215828 U

(51) Int. Cl.[7] .................................................. G01N 3/00
(52) U.S. Cl. ........................................................ 73/798
(58) Field of Search ........................... 73/865.9; 345/207

(56) References Cited

U.S. PATENT DOCUMENTS

| | | | | |
|---|---|---|---|---|
| 5,077,551 A | * | 12/1991 | Saitou .......................... 345/207 |
| 5,594,619 A | * | 1/1997 | Miyagawa et al. ........... 361/681 |
| 5,724,704 A | * | 3/1998 | Seo .................................. 16/254 |
| 5,844,543 A | * | 12/1998 | Tamura et al. ................ 345/156 |
| 6,191,938 B1 | * | 2/2001 | Ohgami et al. ............... 361/681 |
| 6,272,006 B1 | * | 8/2001 | Lee ................................ 361/681 |
| 6,359,774 B1 | * | 3/2002 | Leman .......................... 361/681 |
| 6,530,784 B1 | * | 3/2003 | Yim et al. ....................... 439/31 |

* cited by examiner

*Primary Examiner*—Edward Lefkowitz
*Assistant Examiner*—T Miller
(74) *Attorney, Agent, or Firm*—Harness, Dickey & Pierce

(57) ABSTRACT

A panel testing apparatus is used to test the panel of a mainframe. When the panel is to be opened, the panel separates from the mainframe after the opening apparatus touches the switch. The fastening apparatus can clamp the front side of the panel easily because the lifting apparatus moves the panel to a higher position away from said mainframe. The panel and the rotating apparatus can rotate simultaneously. When closing said panel is desired, the rotating apparatus can push the back side of the panel. The panel and the rotating apparatus rotate toward the mainframe simultaneously until the switch locks the mainframe.

20 Claims, 5 Drawing Sheets

PANEL TESTING APPARATUS

BACKGROUND OF THE INVENTION

1. Field of Invention

The present invention relates to a panel testing apparatus. More particularly, the present invention relates to a panel testing apparatus for performing an open and close test on a panel of a mainframe.

2. Description of Related Art

Verification and test are essential steps in addition to research and development during the manufacturing or design processes. For example, a stress test or fatigue test is essential for a mechanical product. Thus, better design of verification and test tools can easily achieve better quality control.

An open and close test is performed for a LCD panel of a laptop computer during the manufacturing or design processes. The LCD panel having a switch is connected to a mainframe with a pivot. The switch of the LCD panel locks the mainframe when the LCD panel is pressed close to the mainframe.

Conventional open and close test tools can't press the LCD panel very close to its mainframe because a test tool clamp of the prevents it from locking the mainframe. This problem can affect the open and close test results.

For the forgoing reasons, there is a need for well-designed and effective test tools for executing open and close tests of laptop computers.

SUMMARY OF THE INVENTION

It is therefore an objective of the present invention to provide a panel testing apparatus for a laptop computer.

In accordance with the foregoing and other objectives of the present invention, an open and close test apparatus comprises a rotating apparatus, an opening apparatus, a lifting apparatus, a fastening apparatus and a pair of sensors. The open and close test apparatus is used to test the panel of a mainframe. The panel having a switch is connected to the mainframe with a pivot, and the switch can lock the mainframe if the panel is pressed close to the mainframe.

When opening the panel is desired, the panel separates from the mainframe after the opening apparatus touches the switch. The fastening apparatus can clamp the front side of the panel easily because the lifting apparatus moves the panel to a higher position away from said mainframe. The panel and the rotating apparatus can rotate simultaneously.

When closing said panel is desired, the rotating apparatus can push the back side of the panel. The panel and the rotating apparatus rotate toward the mainframe simultaneously until the switch locks the mainframe.

In addition, the open and close test apparatus comprises a debugging mechanism. A pair of sensors is used to detect whether the panel is separated from the mainframe or not. The opening apparatus pushes the switch again or a alarm message is sent in case the panel isn't separated from the mainframe.

In conclusion, the invention has advantages as follows:

1. The panel can be pressed very close to the mainframe because the clamp can be away from the panel and does not affect open and close test results.

2. The fastening apparatus can clamp the panel easily because the lifting apparatus moves the panel to a higher position away from the mainframe.

3. A debugging mechanism comprising a pair of sensors is used to detect whether the panel is separate from the mainframe or not. The opening apparatus pushes the switch again or an alarm message is sent in case the panel isn't separate from the mainframe.

4. The present invention is a simulation of user's operational behavior. It can be used to test switch on and power down of a laptop computer.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
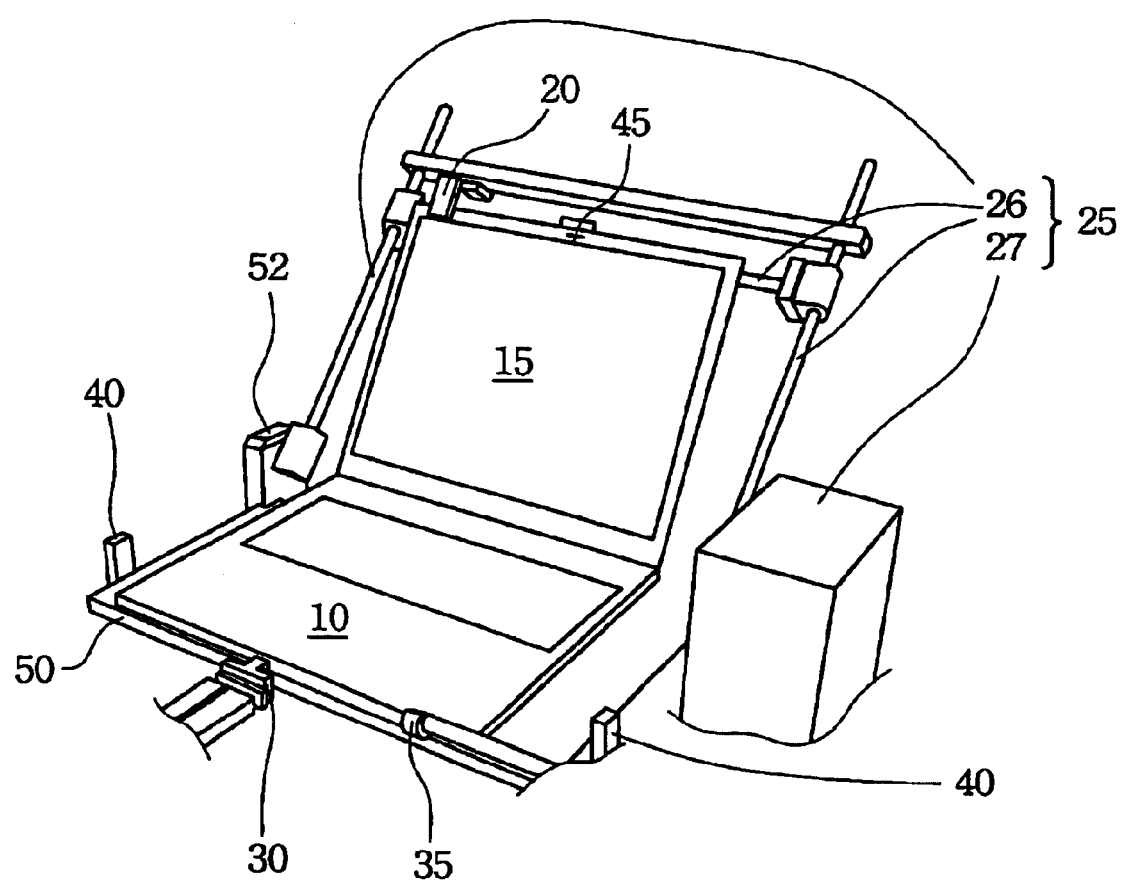
FIG. 1 is a schematic illustration according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 5A:
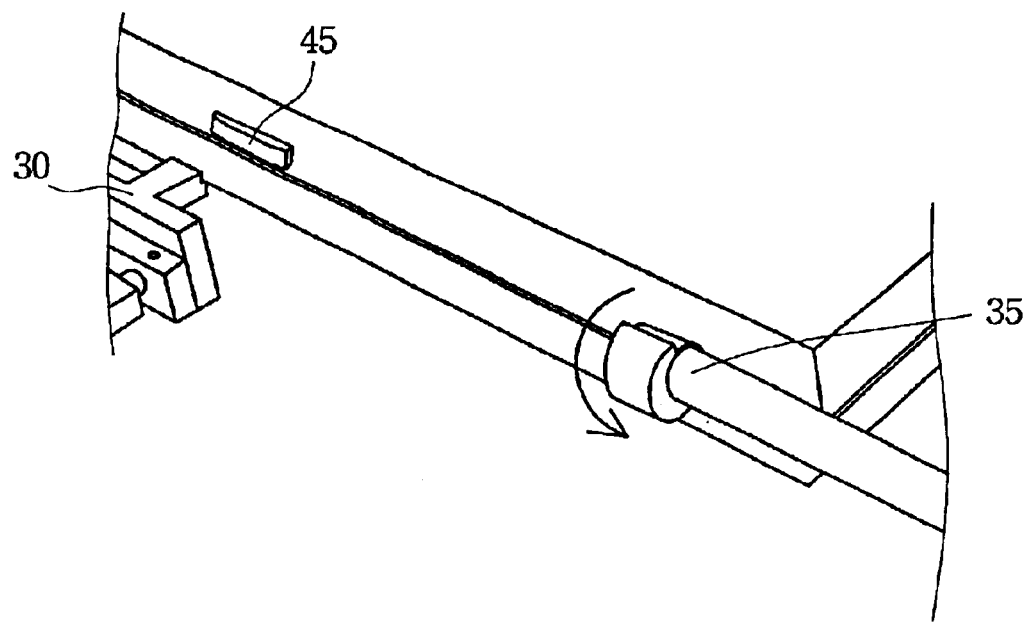
FIGS. 5A, 5B illustrate two action steps of the lifting apparatus according to one preferred embodiment of this invention.

FIG. 1 is a schematic illustration according to one preferred embodiment of this invention. A laptop computer's mainframe 10 is fastened in an open and close test apparatus. The mainframe 10 connects to a panel 15 with pivot. The open and close test apparatus comprises an opening apparatus 30, a lifting apparatus 35, a pair of sensors 40, a rotating apparatus 25, and a fastening apparatus 20. The opening apparatus 30 is used to touch a switch 45 of a panel 15 (see FIG. 5A). The lifting apparatus 35 is used to move the panel 15 to a higher position away from a mainframe 10. The sensors 40 are positioned at the same horizontal level of the panel 15 when the panel 15 is locked to the mainframe 10. The sensors 40 are used to detect whether the panel 15 is separated from the mainframe 10 or not. The rotating apparatus 25 comprises a driving apparatus 27 and a holder rod 26. The holder rod 26 is connected a base 50 by a hinge 52. The fastening apparatus 20 mounted on the holder rod 26 is used to clamp the panel 15.

Figure 2:
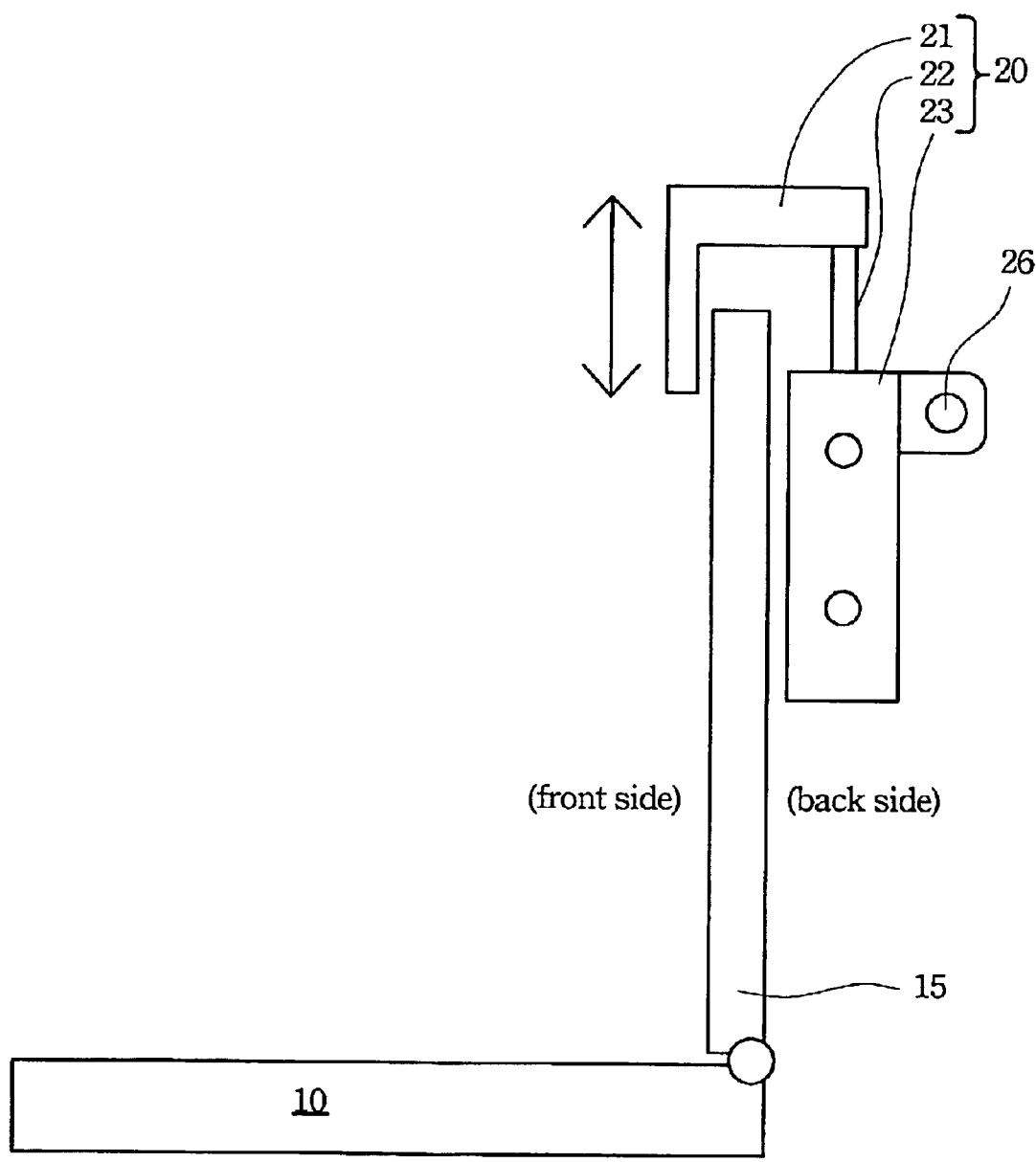
FIG. 2 illustrates an enlarged view of the fastening apparatus in FIG. 1.

FIG. 2 illustrates the enlarged view of the fastening apparatus in FIG. 1. The fastening apparatus 20 comprises a clamp 21, a connecting shaft 22, and a pneumatic driving apparatus 23. The pneumatic driving apparatus 23 can control the clamp 21 via the connecting shaft 22. When the connecting shaft 22 shortens, the clamp 21 can clamp the front side of the panel 15. Thus, The panel 15 and the rotating apparatus 25 can rotate simultaneously. The fastening apparatus 20 is mounted on the holder rod 26. The holder rod 26 can be adjusted to fit the size of panel 15, such as 12.1 inch, 13.5 inch and 14.1 inch.

Figure 3:
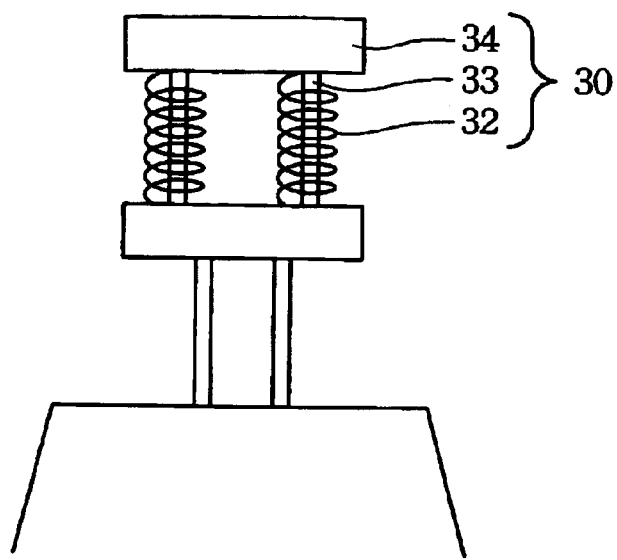
FIG. 3 illustrates an enlarged view of the opening apparatus in FIG. 1.

FIG. 3 illustrates an enlarged view of the opening apparatus in FIG. 1. The opening apparatus 30 comprises a spring 32, a position shaft 33, and an opening plate 34. The spring 32 can be selected according to demand for the switch 45. The position shaft 33 is used to keep the opening plate 34 on the track. The opening apparatus 30 of present invention is intended to protect the switch 45 from damages due to an inappropriate driving force.

Figure 4:
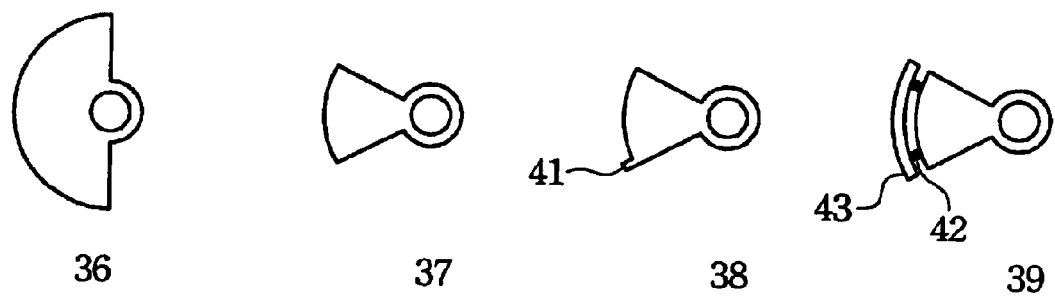
FIG. 4 illustrates four different structures of the lifting apparatus.

FIG. 4 illustrates four different structures of the lifting apparatus. Different designs of the present invention are used to lift different panel designs. The lifting structure 36 is a 180 degrees sector. The lifting structure 37 is a 45 degrees sector. The lifting structure 38 is a 45 degrees sector with a hook 41 and can prevent slipping during the lifting procedures. The lifting structure 38 is a 45 degrees sector with springs 42 and lifting plate 43 and can protect the panel 15 from damages due to an inappropriate driving force.

When the panel 15 is closed by the rotating apparatus 25 (referring to FIG. 1), the pneumatic driving apparatus 23 can lengthen the connecting shaft 22 and the clamp 21 is away from the panel 15 (referring to FIG. 2). Next, The rotating apparatus 25 pushes the back side of the panel 15 toward the mainframe 10 until the switch 45 can lock the mainframe 10. Specially, the clamp need to be away from the panel 15 before the panel 15 comes close to the mainframe.

Figure 5B:
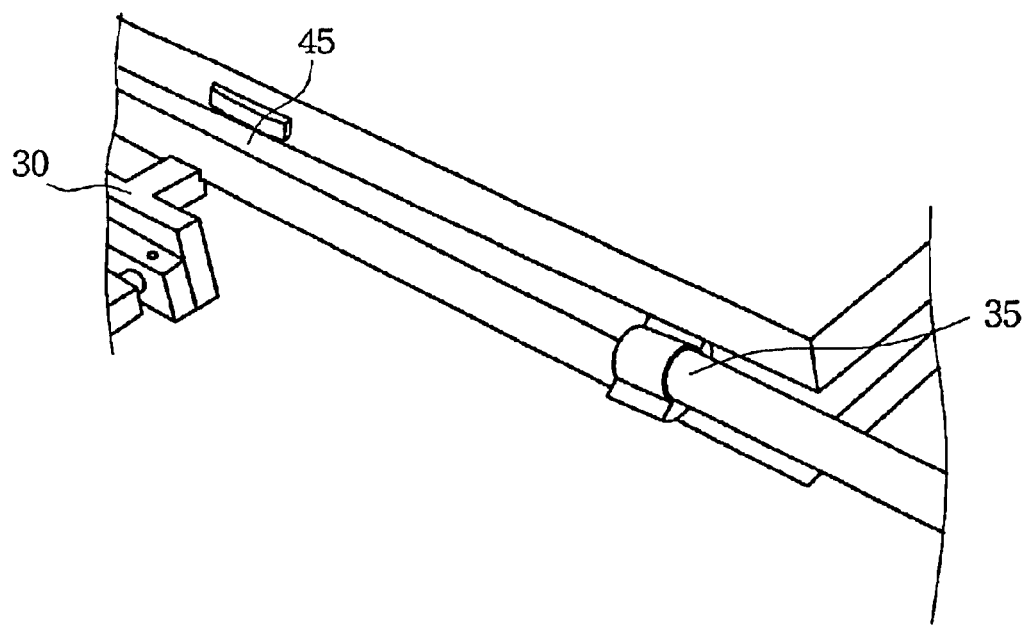
Figure 6:
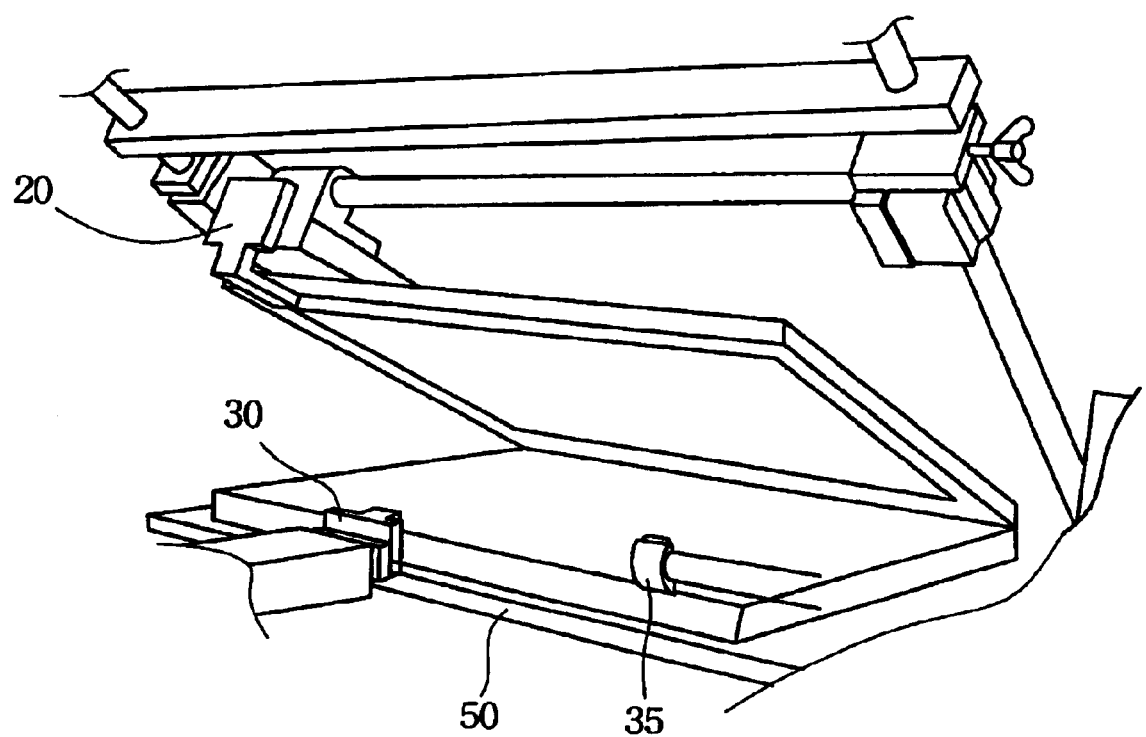
FIG. 6 illustrates the action of the rotating apparatus according to one preferred embodiment of this invention.

When the panel 15 is opened by the rotating apparatus 25, the opening apparatus 30 touches the switch 45 (referring to FIG. 5A) and then the switch unlock the mainframe 10. Next, the fastening apparatus 20 can clamp the panel 15 easily (referring to FIG. 2) because the lifting apparatus 35 moves the panel 15 to a higher position away from the mainframe 10 (referring to FIG. 5B). The fastening apparatus 20 can clamp the front side of the panel 15 (referring to FIG. 2) because the pneumatic driving apparatus 23 can shorten the connecting shaft 22. Then the rotating apparatus 25 and the panel 15 can rotate simultaneously. The lifting apparatus 35 mounted on a rotating driving apparatus can lift the panel 10 by hooking the panel and rotating (referring to FIGS. 3A and 3B).

The open and close procedures are controlled by a computer-readable program. Test rounds can be input into program according to a request. A debugging mechanism is designed in order to detect whether the panel is separate from the mainframe or not when the opening apparatus touch the switch of the panel. The debugging mechanism comprises a pair of sensors (a light emitter and a light receiver). The opening apparatus pushes the switch again or a alarm message is sent if the panel isn't separate from the mainframe.

For example, a pair of light sensors 40 (referring to FIG. 1) is positioned at the horizontal level of the panel 15 when the panel 15 locks the mainframe 10. The sensors check if the panel 15 blocks the light or not when the opening apparatus 30 touches the switch 45 (referring to FIG. 5B). If the panel blocks the light, it indicates that the panel isn't separate from the mainframe. Then some action can be executed, such as pushing the switch again or sending an alarm message.

In conclusion, the invention has advantages as follows:

1. The panel can be pressed very close to the mainframe because the clamp can be away from the panel and does not affect open and close test results.

2. The fastening apparatus can clamp the panel easily because the lifting apparatus moves the panel to a higher position away from the mainframe.

3. A debugging mechanism comprising a pair of sensors is used to detect whether the panel is separate from the mainframe or not. The opening apparatus pushes the switch again or an alarm message is sent in case the panel isn't separate from the mainframe.

4. The present invention is a simulation of a user's operational behavior. It can be used to test switching on and power down of laptop computer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A panel testing apparatus for a computer, applied to open and close a panel of a mainframe of the computer, wherein a switch is connected to said mainframe with a pivot, and said switch locks said mainframe if said panel is pressed close to said mainframe, said panel testing apparatus comprising:

an opening means for unlocking said switch;

a rotating apparatus for rotating said panel, said rotating apparatus comprising a driving apparatus pivotally connected to a holder rod, said driving apparatus operable to rotate the panel by means of said holder rod; and a fastening means connected to said rotating apparatus, wherein said fastening means is used to clamp said panel, whereby said panel and said rotating apparatus rotate simultaneously, wherein:

when opening said panel, said panel separates from said mainframe after said opening means touches said switch, said fastening means easily clamps said panel and said panel and said rotating apparatus being simultaneously rotatable; and when closing said panel, said rotating apparatus pushes a back side of said panel, and said panel and said rotating apparatus rotate toward said mainframe simultaneously until said switch locks said mainframe.

2. The panel testing apparatus of claim 1, wherein said fastening means comprises a clamp clamping a front side of said panel.

3. The panel testing apparatus of claim 1, further comprising a lifting means moving said panel to a higher position away from said mainframe.

4. The panel testing apparatus of claim 1, wherein said lifting means is mounted on a rotating driving means.

5. The panel testing apparatus of claim 1, further comprising a detecting means having a pair of sensors positioned at a horizontal level of said panel when said panel locks to said mainframe.

6. The panel testing apparatus of claim 5, wherein said detecting means detects whether said panel is separate from said mainframe or not, and said opening means pushes said switch again in case said panel is not separate from said mainframe.

7. The panel testing apparatus of claim 5, wherein said detecting means detects whether said panel is separate from said mainframe or not, and an alarm message is sent in case said panel isn't separate from said mainframe.

8. The panel testing apparatus of claim 1, wherein said fastening means comprises a clamp, a connecting shaft, and a pneumatic driving means.

9. The panel testing apparatus of claim 8, wherein said clamp is connected to said pneumatic driving means via said connecting shaft, whereby said pneumatic driving means moves the position of said clamp via said connecting shaft.

10. The panel testing apparatus of claim 8, wherein said clamp clamps said panel when said pneumatic driving means shortens said connecting shaft.

11. A panel testing apparatus for a computer, applied to open and close a panel of a mainframe of the computer, wherein a switch is connected to said mainframe with a pivot, said switch locks said mainframe if said panel is close to said mainframe, and said switch unlocks said mainframe if an opening means touches said switch, said panel testing apparatus comprising:

a lifting means for lifting said panel after said opening means touches said switch;

a rotating apparatus for rotating said panel, said rotating apparatus comprising a driving apparatus pivotally connected to a holder rod, said driving apparatus operable to rotate the panel by means of said holder rod; and a fastening means mounted on said rotating apparatus for clamping said panel, whereby said panel and said rotating apparatus are simultaneously rotatable, wherein:

when opening said panel, said panel separates from said mainframe after said opening means touches said switch, said fastening means easily clamps said panel because said lifting means moves said panel to a higher position away from said mainframe, and said panel and said rotating apparatus rotates simultaneously; and when closing said panel, said rotating apparatus pushes a back side of said panel, and said panel and said rotating apparatus rotate toward said mainframe simultaneously until said switch locks said mainframe.

12. A panel testing apparatus for a computer, said panel testing apparatus comprising:

a base for supporting the computer;

a hinge, mounted on said base;

a driving apparatus, mounted on said base;

a holder rod, having two ends, wherein one end is pivotally connected said base by said hinge and the other end is pivotally connected with said driving apparatus and being rotated by the same;

an opening apparatus touching a switch of a panel for unlocking the panel from a mainframe of the computer, wherein the panel is pivotally connected with the mainframe; and a fastening apparatus, fixed on said holder rod to clamp the panel, wherein said driving apparatus rotates the panel by means of said holder rod when said fastening apparatus secures the panel.

13. The panel testing apparatus of claim 12, further comprising a detecting means having a pair of sensors positioned on said base at the same level as that of the panel when the panel locks to the mainframe, whereby said pair of sensors detect whether the panel is opened or not.

14. The panel testing apparatus of claim 12, wherein said fastening apparatus comprising a pneumatic driving means, a clamp and a connecting shaft connecting said pneumatic driving means and said clamp, whereby said pneumatic driving means moves said clamp by lengthening or shortening said connecting shaft.

15. A panel testing apparatus for a computer, said panel testing apparatus comprising:

a base for supporting the computer;

a hinge, mounted on said base;

a driving apparatus, mounted on said base;

a holder rod, having two ends, wherein one end is pivotally connected said base by said hinge and the other end is pivotally connected with said driving apparatus and being rotated by the same;

an opening apparatus touching a switch of a panel for unlocking the panel from a mainframe of the computer, wherein the panel is pivotally connected with the mainframe;

a fastening apparatus, fixed on said holder rod; and a lifting apparatus, raising the panel right after unlocking so that said fastening apparatus can clamp the panel easily, wherein said driving apparatus rotates the panel by means of said holder rod when said fastening apparatus secures the panel.

16. The panel testing apparatus of claim 15, wherein a structure of said lifting means is a 180 degrees sector.

17. The panel testing apparatus of claim 16, wherein a structure of said lifting means is a 45 degrees sector.

18. The panel testing apparatus of claim 16, wherein a structure of said lifting means is a 45 degrees sector having a hook.

19. The panel testing apparatus of claim 16, wherein a structure of said lifting means is a 45 degrees sector having a lifting plate and a spring connecting the sector and the lifting plate.

20. The panel testing apparatus of claim 16, further comprising a detecting means having a pair of sensors positioned on said base at the same level as that of the panel when the panel locks to the mainframe, whereby said pair of sensors detect whether the panel is opened or not.

* * * * *